US007034657B2

(12) United States Patent
Ueda et al.

(10) Patent No.: US 7,034,657 B2
(45) Date of Patent: Apr. 25, 2006

(54) VEHICULAR DOOR LOCK REMOTE CONTROL APPARATUS

(75) Inventors: Shinichi Ueda, Tochigi-ken (JP); Shinichi Arie, Saitama (JP); Kentaro Yoshimura, Tochigi-ken (JP); Suguru Asakura, Utsunomiya (JP); Akira Kamikura, Utsunomiya (JP); Kenichi Sawada, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 365 days.

(21) Appl. No.: 10/680,274

(22) Filed: Oct. 8, 2003

(65) Prior Publication Data

US 2004/0070489 A1 Apr. 15, 2004

(30) Foreign Application Priority Data

Oct. 9, 2002 (JP) ............................ 2002-296812

(51) Int. Cl.
*G05B 19/00* (2006.01)

(52) U.S. Cl. .................................... 340/5.62; 340/6.63

(58) Field of Classification Search ................. 340/5.6, 340/5.61, 5.62, 5.63, 5.64, 5.72, 825.69, 340/825.72, 10.1; 307/10.2, 10.4; 49/14
See application file for complete search history.

(56) References Cited

U.S. PATENT DOCUMENTS

| | | | | |
|---|---|---|---|---|
| 4,458,446 | A * | 7/1984 | Mochida et al. | 49/28 |
| 5,552,641 | A * | 9/1996 | Fischer et al. | 307/10.5 |
| 5,835,022 | A * | 11/1998 | Amano | 340/5.64 |
| 6,670,883 | B1 * | 12/2003 | Asakura et al. | 340/5.61 |
| 6,700,476 | B1 * | 3/2004 | Okada et al. | 340/5.62 |
| 6,801,120 | B1 * | 10/2004 | Hara | 340/5.72 |
| 6,831,547 | B1 * | 12/2004 | Watarai et al. | 340/5.61 |

FOREIGN PATENT DOCUMENTS

| | | |
|---|---|---|
| EP | 0 937 844 A1 | 8/1999 |
| JP | 60-159259 | 8/1985 |
| JP | 10-176448 | 6/1998 |
| JP | 11-141211 | 5/1999 |

* cited by examiner

*Primary Examiner*—Michael Horabik
*Assistant Examiner*—William Bangachon
(74) *Attorney, Agent, or Firm*—Arent Fox PLLC

(57) ABSTRACT

When a door sensor is touched, a vehicle-mounted unit and a portable unit performs mutual communications for authentication, and the doors are unlocked. When the door sensor is touched without intending to unlock the doors, wasteful consumption of electric energy is avoided which would otherwise result from mutual communications for authentication triggered by a request signal. When the door sensor may possibly be operated not for the purpose of unlocking the doors, e.g., when a CPU detects the doors as being already unlocked from a signal outputted from a door lock knob switch, a request signal is inhibited from being transmitted from the vehicle-mounted unit to the portable unit.

10 Claims, 11 Drawing Sheets

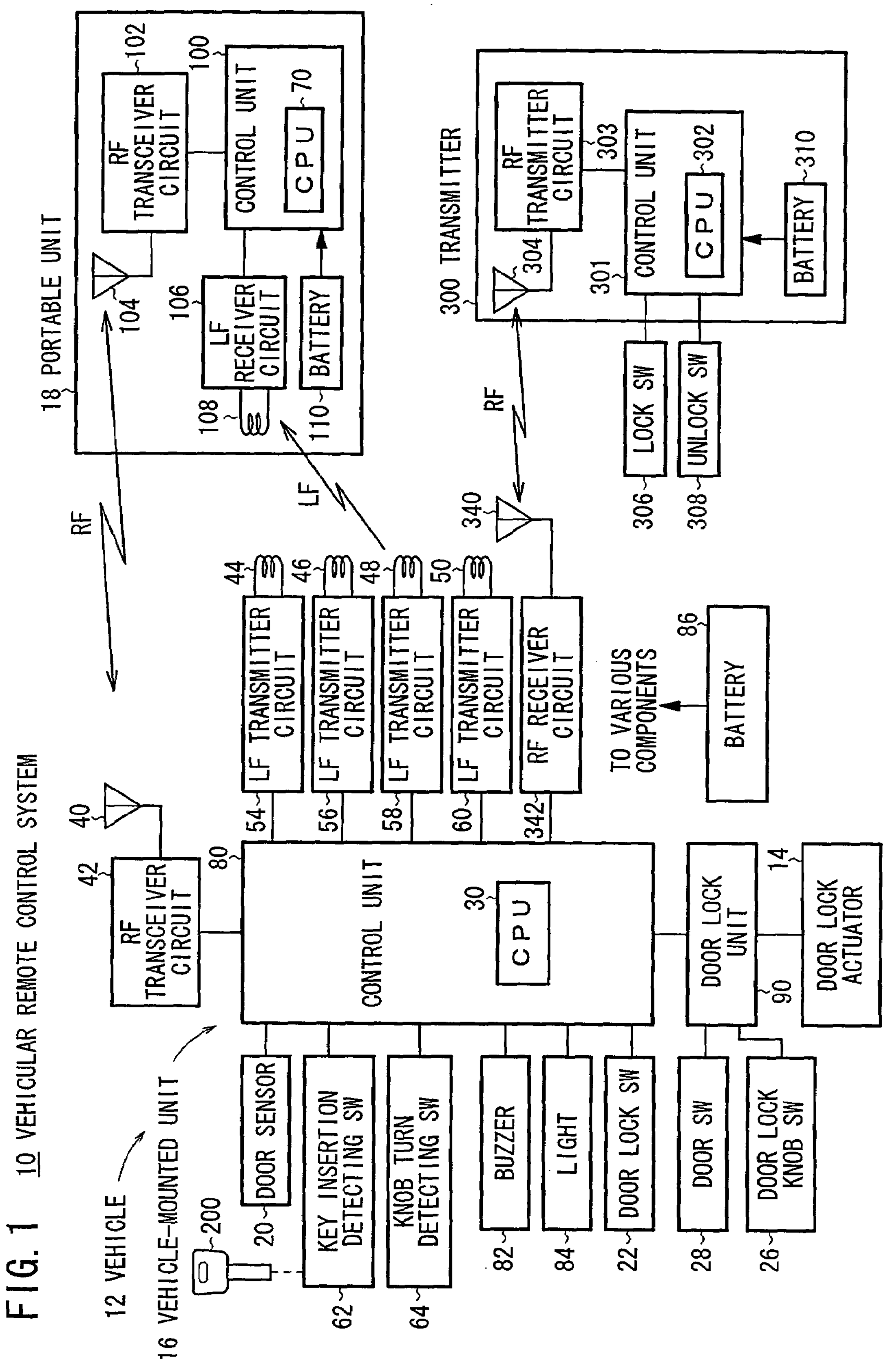
FIG. 1
10 VEHICULAR REMOTE CONTROL SYSTEM
12 VEHICLE
16 VEHICLE-MOUNTED UNIT
18 PORTABLE UNIT
RF TRANSCEIVER CIRCUIT
CONTROL UNIT
CPU
LF RECEIVER CIRCUIT
BATTERY
300 TRANSMITTER
RF TRANSMITTER CIRCUIT
LOCK SW
UNLOCK SW
RF
LF
LF TRANSMITTER CIRCUIT
RF RECEIVER CIRCUIT
TO VARIOUS COMPONENTS
DOOR LOCK UNIT
DOOR LOCK ACTUATOR
DOOR SENSOR
KEY INSERTION DETECTING SW
KNOB TURN DETECTING SW
BUZZER
LIGHT
DOOR LOCK SW
DOOR SW
DOOR LOCK KNOB SW

S3: DOOR SENSOR SIGNAL INPUT PROCESSING SEQUENCE

VEHICULAR DOOR LOCK REMOTE CONTROL APPARATUS

BACKGROUND OF THE INVENTION

1. Field of the Invention

The present invention relates to a smart keyless entry system for unlocking the doors of a vehicle based on mutual authentication between a portable unit and a vehicle-mounted unit (vehicular controller) when an user of the portable unit touches an outer handle of the vehicle which functions as a touch sensor, or a vehicular door lock remote control apparatus for unlocking the doors of a vehicle in response to a key operation on a keyless transponder.

2. Description of the Related Art

Recently, various vehicular door lock remote control apparatus have been proposed for remotely locking and unlocking the doors of a vehicle with a portable unit that is capable of sending and receiving a radio signal.

For example, according to the first arrangement of Japanese laid-open patent publication No. 60-159259, there is disclosed a smart entry system in which the vehicle transmits a request signal when a door switch on an outer side of a vehicle is operated, and when a normal response signal is received from a portable unit, the doors of the vehicle are unlocked based on the result of a mutual authentication process.

According to the first arrangement, during a certain period of time after the doors are locked, the vehicle does not transmit a request signal unless the portable unit is present in a reception range near the vehicle. Therefore, even when the door switch is tampered with, a request signal will not be transmitted from the vehicle.

According to the second arrangement of Japanese laid-open patent publication No. 11-141211, a smart entry system based on mutual authentication without button operations is adopted in combination with a keyless entry system based on unidirectional authentication from a portable unit to a vehicle using button operations. When the smart entry system and the keyless entry system conflict with each other, priority is given to the keyless entry system.

Other systems for locking doors that have been conventionally available in the art include a keyless lock system for operating a door lock knob switch to lock the doors while the doors are open, and a key-lock system for locking the doors with an ignition key.

According to the third arrangement of Japanese laid-open patent publication No. 10-176448, since the user of a smart entry system tends to try the door handle for confirming that the door is locked immediately after locking the door, a timer prevents the smart entry system from being actuated by the operation of the door handle which unlocks the door, for a predetermined period of time immediately after the door is locked.

With the first arrangement which inhibits a request signal from being transmitted for a given period of time, when the door handle is operated after the door is locked by another locking process, the vehicle transmits a request signal and the door is unlocked. Therefore, it is impossible to confirm that the door is actually locked.

With the second arrangement, if the door handle is operated during operation of the keyless lock system, a request signal is transmitted and the door is unlocked, making it impossible to perform keyless locking on the doors.

With the third arrangement, the predetermined period is set to 2 seconds or longer. However, it is difficult to set the predetermined period because the time required to confirm the locking of the door differs from user to user.

SUMMARY OF THE INVENTION

It is therefore an object of the present invention to provide a vehicular door lock remote control apparatus which reliably prevents unnecessary request signals from being transmitted, making it possible to avoid unnecessary consumption of electric power, i.e., to prevent electric power from being wasted.

In the following summary of invention, reference characters used in the accompanying drawings are referred to for an easier understanding of the present invention. However, the subject matter described in the summary of the invention should not be interpreted as being limited to those details to which the reference characters are assigned. It should be noted that the scope of the invention should be limited to only claimed details and equivalents thereof.

A vehicular door lock remote control apparatus according to the present invention includes a door sensor (20) for detecting when a door handle (21) on an outer side of a vehicle is touched and outputting a signal representing the detected touch, vehicle-side transmitting means (30, 48, 50, 58, 60) for transmitting a transmission request signal in response to the signal outputted from the door sensor, a portable unit (18) for transmitting identification information in response to the transmission request signal from the vehicle-side transmitting means, vehicle-side receiving means (30, 40, 42) for receiving the identification information transmitted from the portable unit, control means (80) for determining whether the identification information received by the vehicle-side receiving means matches identification information stored on the vehicle, and unlocking a door of the vehicle based on the determined result, locked/unlocked state detecting means (26) for detecting a locked/unlocked state of the door, a timer (step S302) for starting to measure a predetermined time when the locked/unlocked state detecting means detects when the door has changed from the unlocked state to the locked state, and inhibiting means (step S309) for inhibiting the transmission request signal from being transmitted from the vehicle-side transmitting means while the timer is measuring the predetermined time.

With the above arrangement, the vehicular door lock remote control apparatus transmits a request signal when an outer door handle is touched, and unlocks the door depending on whether identification information is received or not in response to the request signal. The vehicular door lock remote control apparatus inhibits the request signal from being transmitted during a predetermined time after the door is detected as having changed from the unlocked state to the locked state. When there is no need to unlock the door, the request signal is inhibited from being transmitted, preventing the electric energy stored in a battery on the vehicle from being unduly consumed. After the door is locked by a keyless entry system, a keyless locking system, or a key locking system, the locking of the door can be confirmed by operating the outer door handle.

The inhibiting means comprises means for inhibiting (step S307) the transmission request signal from being transmitted from the vehicle-side transmitting means when the locked/unlocked state detecting means detects the unlocked state of the door (affirmative in step S305).

Alternatively, the vehicular door lock remote control apparatus further includes open/closed state detecting means (step S304) for detecting an open/closed state of the door, the inhibiting means comprising means for inhibiting (step S306) the transmission request signal from being transmitted from the vehicle-side transmitting means when the open/closed state detecting means detects the open state of the door.

Consequently, when the door is locked or the door is open, no request signal is transmitted even if the outer door handle is touched. Thus, the door is prevented from being unnecessarily unlocked when it is closed while the outer door handle is being gripped, and since no door unlocking signal is outputted even if the outer door handle is touched when the door is open as it is locked during a keyless locking process, the keyless locking process is prevented from being undesirably canceled.

A vehicular door lock remote control apparatus according to another aspect of the present invention includes a door sensor (20) for detecting when a door handle (21) on an outer side of a vehicle is touched and outputting a signal representing the detected touch, vehicle-side transmitting means (30, 48, 50, 58, 60) for transmitting a transmission request signal in response to the signal outputted from the door sensor, a portable unit (18) for transmitting identification information in response to the transmission request signal from the vehicle-side transmitting means, vehicle-side receiving means (30, 40, 42) for receiving the identification information transmitted from the portable unit, control means (80) for determining whether the identification information received by the vehicle-side receiving means matches identification information stored on the vehicle, and unlocking a door of the vehicle based on the determined result, locked/unlocked state detecting means (26) for detecting a locked/unlocked state of the door, and inhibiting means (step S307) for inhibiting the transmission request signal from being transmitted from the vehicle-side transmitting means when the locked/unlocked state detecting means detects the unlocked state of the door.

A vehicular door lock remote control apparatus according to still another aspect of the present invention includes a door sensor (20) for detecting when a door handle (21) on an outer side of a vehicle is touched and outputting a signal representing the detected touch, vehicle-side transmitting means (30, 48, 50, 58, 60) for transmitting a transmission request signal in response to the signal outputted from the door sensor, a portable unit (18) for transmitting identification information in response to the transmission request signal from the vehicle-side transmitting means, vehicle-side receiving means (30, 40, 42) for receiving the identification information transmitted from the portable unit, control means (80) for determining whether the identification information received by the vehicle-side receiving means matches identification information stored on the vehicle, and unlocking a door of the vehicle based on the determined result, open/closed state detecting means (28) for detecting an open/closed state of the door, and inhibiting means (step S306) for inhibiting the transmission request signal from being transmitted from the vehicle-side transmitting means when the open/closed state detecting means detects the open state of the door.

With the above arrangement, the vehicular door lock remote control apparatus transmits a request signal when an outer door handle is touched, and unlocks the door depending on whether identification information is received or not in response to the request signal. The vehicular door lock remote control apparatus inhibits the request signal from being transmitted even if the outer door handle is touched when the door is unlocked or the door is open. Therefore, even if the outer door handle is touched when the door is open as it is unlocked during a keyless locking process, no request signal is transmitted, and no door unlocking signal is outputted even if the portable unit is carried. It is thus possible to perform keyless locking on the door while the outer door handle is being gripped. Since no unlocking signal is outputted when there is no need to unlock the door, the electric energy stored in batteries of the vehicle and the portable unit is prevented from being unduly consumed. Furthermore, because no request signal is transmitted during the keyless locking process, a door lock actuator is prevented from chattering.

The vehicular door lock remote control apparatus further includes a switch (22) disposed on or near the door handle for outputting an operation signal when operated, the vehicle-side transmitting means comprising means for transmitting the transmission request signal in response to the operation signal outputted from the switch, the control means comprising means for locking the door if the identification information received by the vehicle-side receiving means is in agreement with the identification information stored on the vehicle when the operation signal is inputted from the switch.

If a door lock switch is disposed on the outer door handle or in the vicinity thereof, then it can easily be operated while the outer door handle is being gripped or based on a support provided by the outer door handle.

The locked/unlocked state detecting means may comprise a door lock knob switch (26).

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a block diagram of a vehicular remote control system incorporating therein a vehicular door lock remote control apparatus according to an embodiment of the present invention;

DESCRIPTION OF THE PREFERRED EMBODIMENT

The embodiment of the present invention will be described below with reference to FIGS. 1 through 11.

Figure 2:
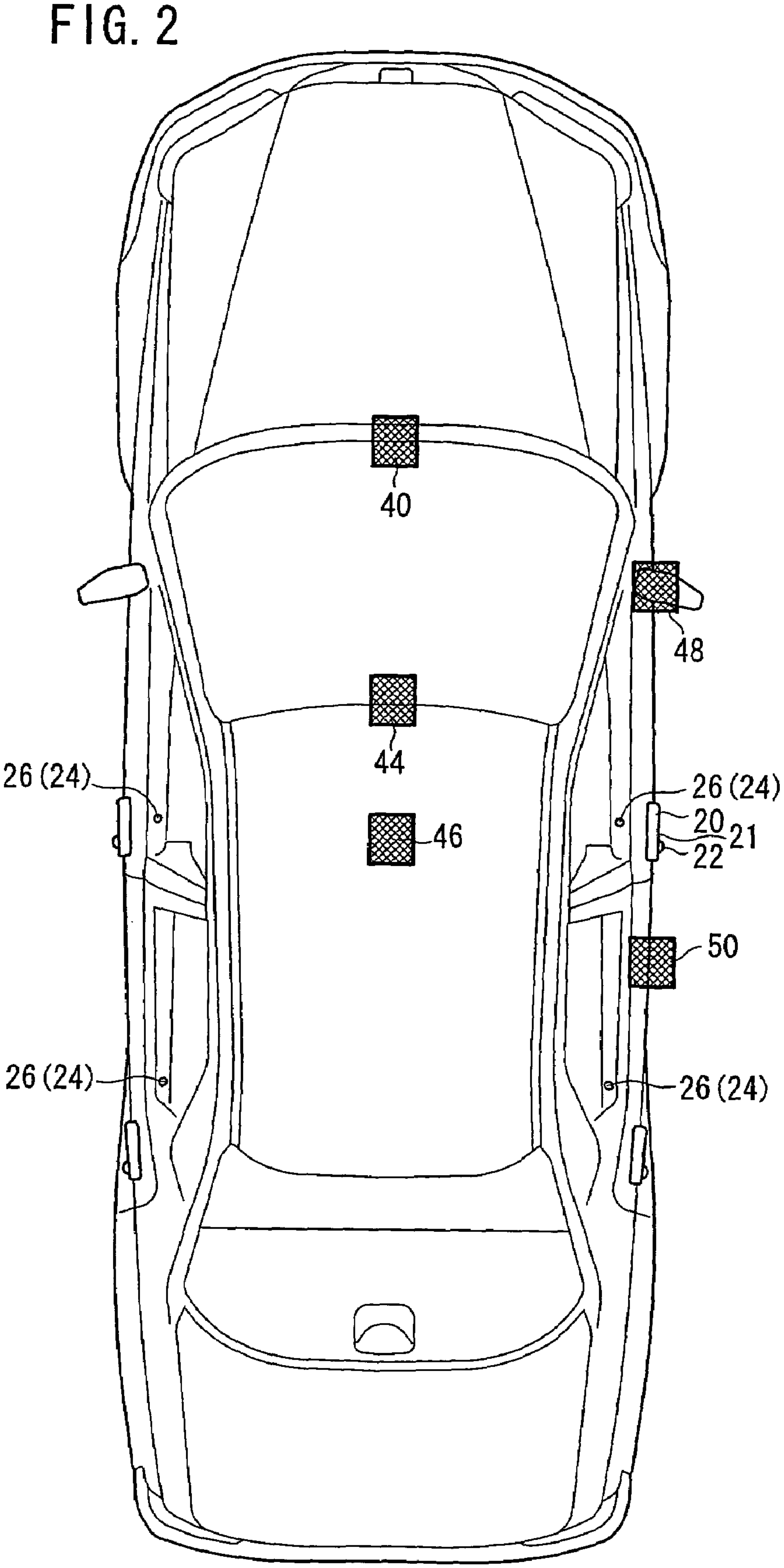
FIG. 2 is a plan view of a vehicle incorporating therein the vehicular remote control system shown in FIG. 1.
Figure 3:
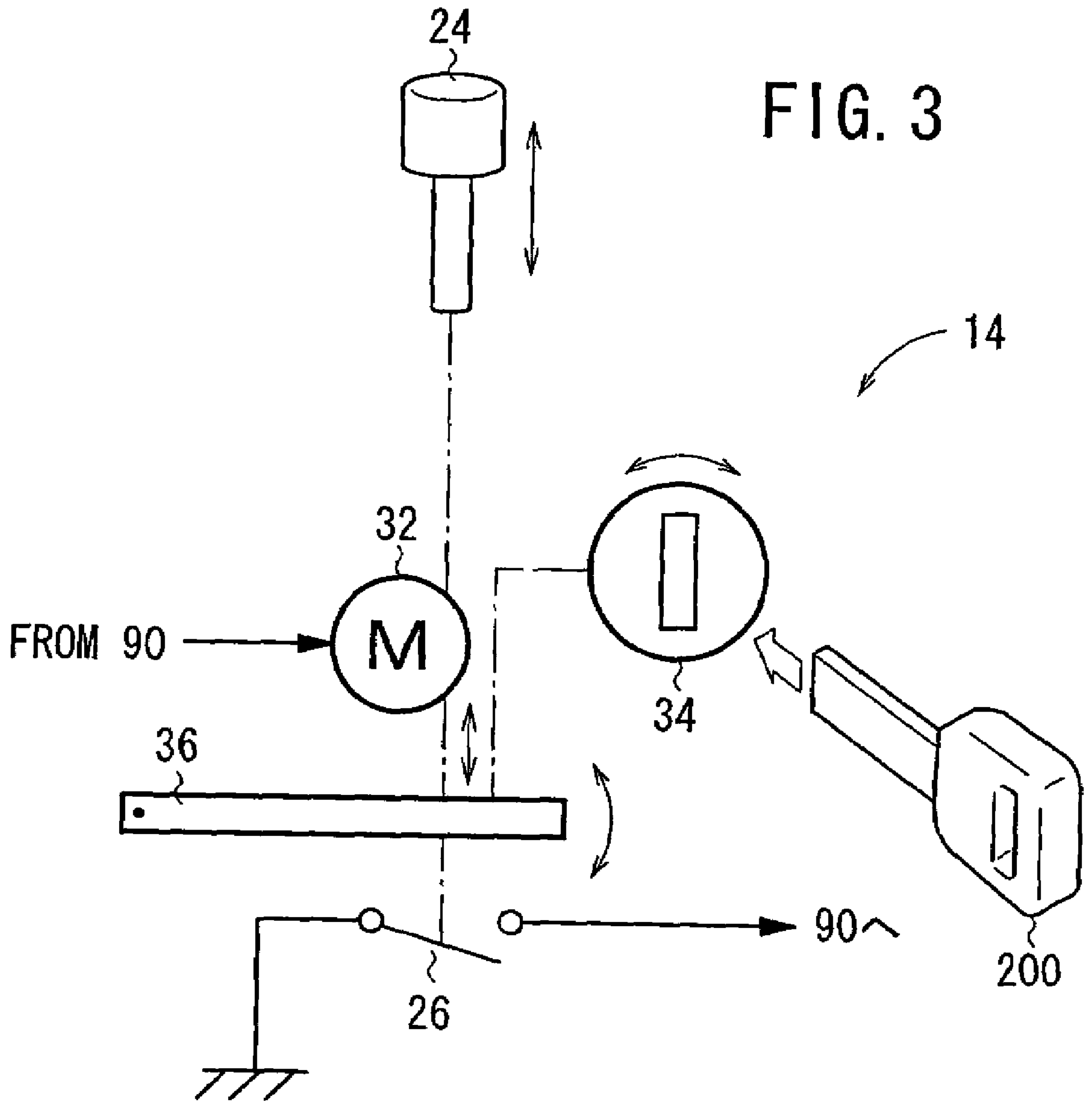
FIG. 3 is a schematic view of a door lock actuator for locking a door.
Figure 4:
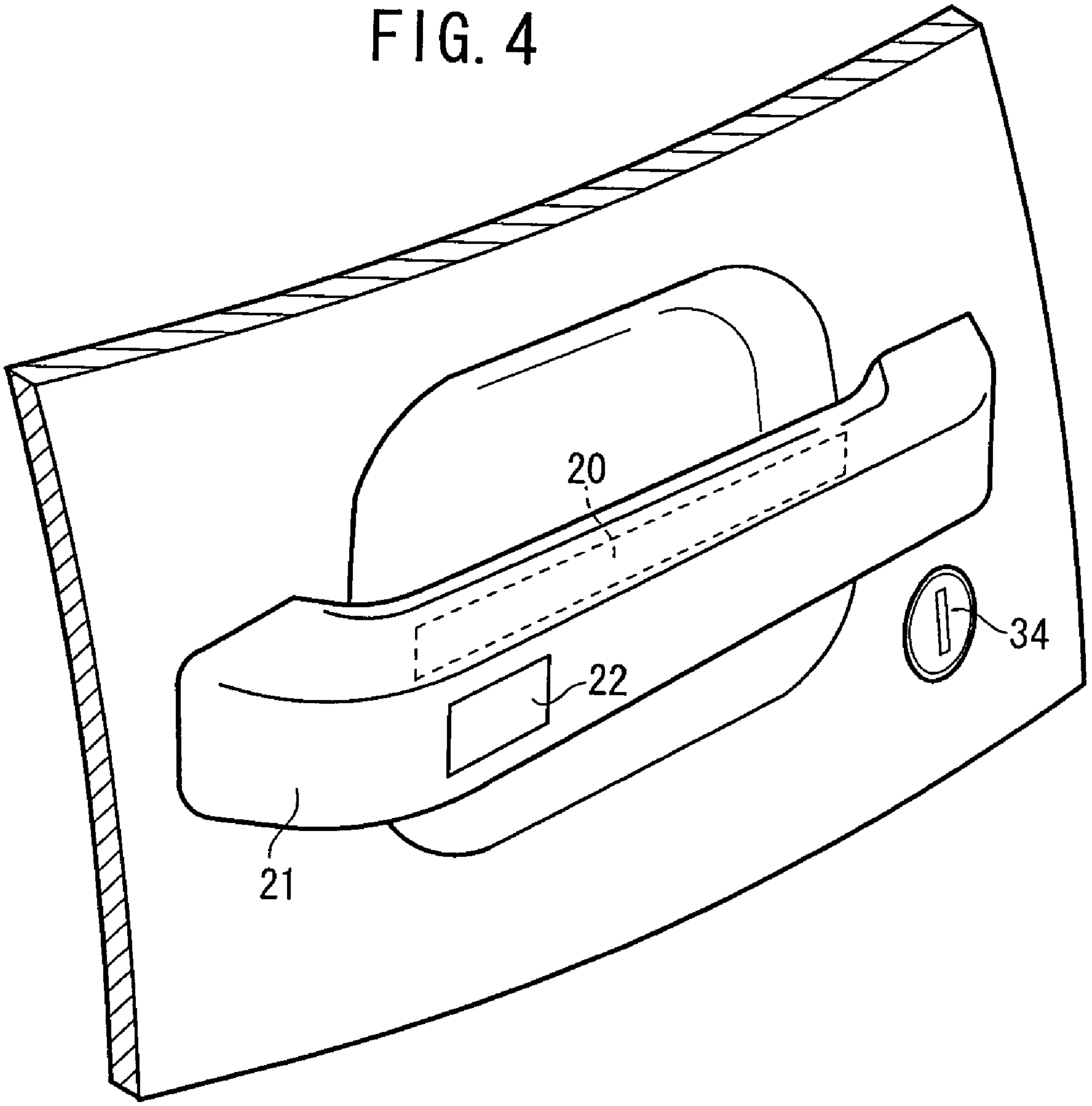
FIG. 4 is an enlarged fragmentary perspective view of a driver-side door of the vehicle in the vicinity of an outer door handle on the driver-side door, which is a handle on an outer side of the vehicle.

FIG. 1 shows in block form a vehicular remote control system 10 incorporating a vehicular door lock remote control apparatus according to an embodiment of the present invention. FIG. 2 shows in plan view a vehicle 12 incorporating the vehicular remote control system 10. FIG. 3 schematically shows a door lock actuator 14 for locking a door. FIG. 4 shows in enlarged fragmentary perspective a driver-side door of the vehicle 12 in the vicinity of an outer door handle 21 on the driver-side door.

As shown in FIGS. 1 through 4, the vehicular remote control system 10 basically comprises a vehicle-mounted unit 16 as a vehicular controller mounted on a vehicle 12, a portable unit 18 for use in a smart entry system for locking and unlocking the doors of the vehicle 12 (including locking the doors with lock switches and automatically locking the doors), and a portable transmitter 300 for use in a keyless entry system (a keyless locking and unlocking system).

The portable unit 18 performs mutual authentication communications with the vehicle-mounted unit 16, and the transmitter 300 only performs unidirectional authentication communications.

The portable unit 18 has a control unit 100 connected through an RF (radio frequency) transceiver circuit 102 to an RF antenna 104 for transmitting and receiving an RF signal having a frequency of 315 [MHz]. The control unit 100 is also connected through an LF receiver circuit 106 to an LF antenna 108 for receiving an LF (low frequency) signal having a frequency of 125 [kHz]. The portable unit 18 is powered by a replaceable cell 110 such as a button cell, which supplies electric energy to the control unit 100. The portable unit 18 is about the same size as a credit card incorporating an IC (Integrated Circuit) chip.

The vehicle-mounted unit 16 transmits an LF signal as a transmission request signal to the portable unit 18. The LF signal thus transmitted to the portable unit 18 wakes up (activates) the control unit 100 from a sleep mode. Since the control unit 100 stays in the sleep mode unless it is supplied with the LF signal from the vehicle-mounted unit 16, the portable unit 18 saves energy.

The RF signal is used in mutual communications between the portable unit 18, which is protected for security, and the vehicle-mounted unit 16, to enable the vehicle-mounted unit 16 to authenticate the portable unit 18 with identification information representative of an identification (ID) signal and a cryptographic code, and also to shorten the time required to authenticate the portable unit 18 via such mutual communications.

The LF signal can be transmitted within an effective transmission range of about 1 [m], and the RF signal can be transmitted an effective transmission range covering several times more than the effective transmission range of the LF signal.

The transmitter 300 has a control unit 301 connected through an RF transmitter circuit 303 to an RF antenna 304 for transmitting an RF signal which either has a frequency different from the frequency of the RF signal transmitted and received by the portable unit 18, or is modulated differently from the RF signal transmitted and received by the portable unit 18. The control unit 301 is also connected to a lock switch 306 and an unlock switch 308, each comprising a pushbutton switch. The RF signal transmitted by the RF antenna 304 either has a frequency different from the frequency of the RF signal transmitted and received by the portable unit 18, or is modulated differently from the RF signal transmitted and received by the portable unit 18 in order to avoid interference with the portable unit 18.

The lock switch 306 and the unlock switch 308 of the transmitter 300 may be constructed as a single toggle switch for switching between locking and unlocking operations of the doors.

The transmitter 300 is powered by a replaceable cell 310 such as a button cell, which supplies electric energy to the control unit 301. The transmitter 301 has a size large enough to be gripped by three fingers, i.e., the thumb, the index finger, and the middle finger, to operate the lock switch 306 or the unlock switch 308.

When the lock switch 306 or the unlock switch 308 is operated, it wakes up the control unit 301 from a sleep mode. The transmitter 300 is thus saves energy.

The RF signal transmitted from the transmitter 300 to the vehicle-mounted unit 16, is a signal comprising an identification signal and a rolling code for security. The RF signal can be transmitted from the transmitter 300 within an effective transmission range which is about the same as the effective RF signal transmission range of the portable unit 18.

The vehicle 12 has a door sensor 20 (see FIG. 2) which is operated to unlock the doors of the vehicle 12 and a door lock switch 22 which is operated to lock the doors. The door sensor 20 and the door lock switch 22 are mounted on the outer door handle 21 on a driver-side door of the vehicle 12, and are used in the smart entry system.

The door sensor 20 is disposed on an inner surface of the outer door handle 21, and comprises a touch sensor of which electrostatic capacitance changes. The door sensor 20 is normally turned off, and is turned on when a person triggers it, i.e., when a person's finger touches the inner surface of the outer door handle. The door lock switch 22 is disposed on an outer surface of the outer door handle 21, and comprises a mechanical switch such as a microswitch. The door lock switch 22 is normally turned off, and is turned on when a person operates it, i.e., when a person's finger presses a button that is mounted on the outer surface of the outer door handle 21.

Each of the doors of the vehicle 12 has, in its door lining, a door lock knob switch 26 that is turned off to lock the door when a door lock knob 24 is manually pressed downward, and turned on to unlock the door when the door lock knob 24 is manually pulled upward, and a door switch 28 for detecting whether the door is open or closed. The door lock knob switch 26 is turned off when the door is locked, and turned on when the door is unlocked. The door switch 28 is turned on when the door is open, and turned off when the door is closed.

As shown in FIG. 3, the door is locked or unlocked by a locking lever 36 that is turned a given angle when the door lock knob 24 that is connected to the locking lever 36 by a cam, gear, and link mechanism is moved downwardly or upwardly, or when a lock motor 32 that is connected to the locking lever 36 by a cam, gear, and link mechanism is energized or de-energized by a door lock unit 90, or when a key cylinder 34 that is connected to the locking lever 36 by a cam, gear, and link mechanism is manually turned clockwise or counterclockwise by an immobilizer key 200 inserted into the key cylinder 34.

On ordinary vehicles, the cam, gear, and link mechanism operates the door lock knob 24 to move vertically in response to rotation of the key cylinder 34 and rotation of the lock motor 32. On the other hand, the key cylinder 34 and the lock motor 32 do not rotate when the door lock knob 24 is moved vertically. Also, the lock motor 32 does not rotate when the key cylinder 34 rotates, and the key cylinder 34 does not rotate when the lock motor 32 rotates.

The immobilizer key 200 comprises an ordinary mechanical key with a transponder incorporated in its grip. To start the engine of the vehicle 12, the immobilizer key 200 is inserted into a knob slot defined in a knob-type ignition assembly positioned near the steering wheel of the vehicle 12. When the immobilizer key 200 is inserted into the knob slot, the immobilizer key 200 and an immobilizer unit (not shown) attempt to mutually communicate for authentication. After mutual communications for authentication are successfully carried out, an ignition knob of the ignition assembly is turned by the immobilizer key 200 from an ignition on position to a start position, thus starting the engine of the vehicle 12. Even when the immobilizer key 200 is not inserted into the knob slot, the portable unit 18 and the control unit 80 attempt to mutually communicate with each other for authentication. After mutual communications for authentication are successfully carried out, the ignition knob of the ignition assembly is turned from the ignition on position to the start position, thus starting the engine of the vehicle 12. The ignition knob can be turned successively through an off position, an ACC (accessory) position, an ignition on position, and a start position in the named order as with known ignition cylinders.

To the control unit 80, there are connected a key insertion detecting switch 62 for detecting when the immobilizer key 200 is inserted into the knob slot and outputting a signal representing the detected insertion, and a knob turn detecting switch 64 for detecting when the ignition knob is turned and outputting a signal representing the detected turn.

The vehicle 12 also has an RF unit including an RF antenna 40 and an RF transceiver circuit 42 that are disposed below the surface of the instrument panel, the RF unit being used in the smart entry system. Mutual RF communications for authentication are carried out between the control unit 80 of the vehicle-mounted unit 16 and the control unit 100 of the portable unit 18 when an RF signal transmitted from the vehicle 12 through the RF antenna 40 is received by the portable unit 18 through the RF antenna 104, and an RF signal transmitted from the portable unit 18 through the RF antenna 104 is received by the vehicle 12 through the RF antenna 40.

The vehicle-mounted unit 16 further includes an LF antenna 44 for intravehicular communications (intravehicular LF antenna) mounted on a central vehicle floor at front seats of the vehicle 12, an intravehicular LF antenna 46*b* mounted on a vehicle floor at rear seats of the vehicle 12, an LF antenna 48 for extravehicular communications (extravehicular LF antenna) mounted on a door mirror on the driver-side door of the vehicle 12, and an extravehicular LF antenna 50 mounted on the door lining of the door behind the driver-side door. These antennas 44, 46, 48, 50 are used in the smart entry system. The vehicle-mounted unit 16 also includes LF transmitter circuits 54, 56, 58, 60 connected respectively to the intravehicular LF antenna 44, the intravehicular LF antenna 46, the extravehicular LF antenna 48, and the extravehicular LF antenna 50. LF signals which are supplied from the LF transmitter circuits 54, 56, 58, 60 are transmitted respectively through the intravehicular LF antenna 44, the intravehicular LF antenna 46, the extravehicular LF antenna 48, and the extravehicular LF antenna 50 to the portable unit 18, and received by the LF receiver circuit 106 through the LF antenna 108. In this manner, request signals for requesting the transmission of an identification signal are transmitted from the vehicle-mounted unit 16 to the portable unit 18.

Figure 5:
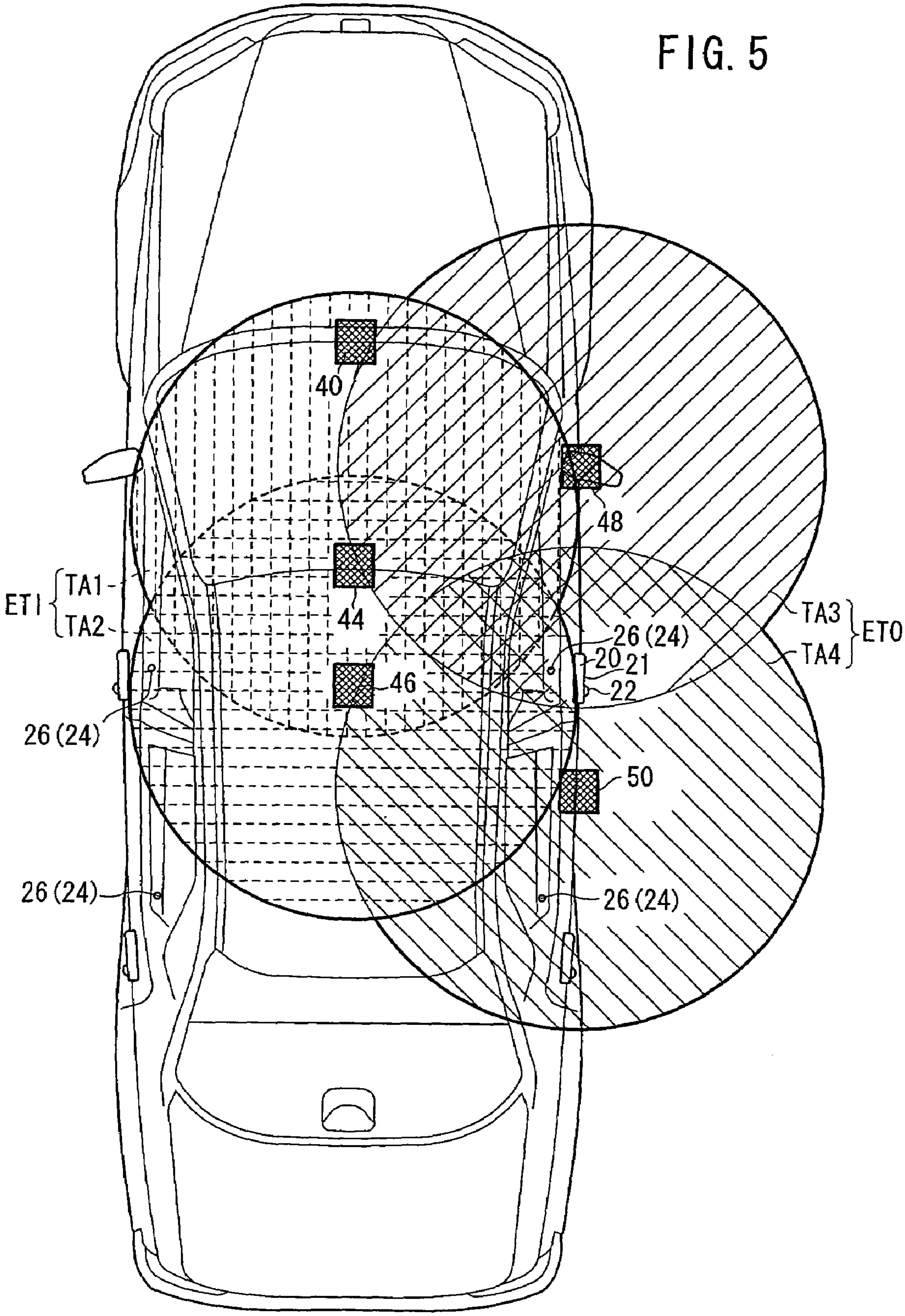
FIG. 5 is a plan view illustrative of effective transmission ranges of transmission antennas for transmitting intravehicular and extravehicular LF signals.

FIG. 5 shows effective transmission ranges TA1–TA4 of the LF antennas 44, 46, 48, 50 for request signals to be transmitted from the LF antennas 44, 46, 48, 50 to the portable unit 18 to request the portable unit 18 to transmit signals. The effective transmission ranges TA1, TA2 of the intravehicular LF antennas 44, 46 are limited within the passenger compartment of the vehicle 12. The effective transmission ranges TA3, TA4 of the extravehicular LF antennas 48, 50 are limited within predetermined circular spaces outside the vehicle 12, each having a diameter which is substantially equal to the arm's length of the driver of the vehicle 12.

When the portable unit 18 is located within the vehicle 12, the position of the portable unit 18 can be detected in a range ETI enclosed by the thick solid line representing the effective transmission ranges TA1, TA2 of the intravehicular LF antennas 44, 46 for request signals. The range ETI is placed within the passenger's compartment of the vehicle 12 and also referred to as within the passenger's compartment. When the portable unit 18 is located outside the vehicle 12, the position of the portable unit 18 can be detected in a range ETO outside the vehicle 12 which is enclosed by the thick solid line representing the effective transmission ranges TA3, TA4 of the extravehicular LF antennas 48, 50 for request signals. The range ETO is also referred to as near the vehicle, near the doors, or around the vehicle.

The effective transmission ranges for request signals are ranges in which the portable unit 18 can receive request signals that are transmitted from the LF antennas 44, 46, 48, 50.

An effective transmission/reception range for an RF signal is a circular range around the position of each of the RF antennas 40, 104, the circular range having a diameter of about 5 [m]. Therefore, the effective transmission/reception range is much greater than the effective transmission ranges for request signals.

The effective transmission/reception range for an RF signal is a range in which the portable unit 18 or the vehicle-mounted unit 16 can receive an RF signal that is transmitted from the vehicle-mounted unit 16 or the portable unit 18.

The vehicle 12 further includes an RF unit including an RF antenna 340 and an RF receiver circuit 342 that are disposed below the surface of the instrument panel for receiving the RF signal from the transmitter 300, the RF unit being used in the smart entry system.

As shown in FIG. 1, the vehicle-mounted unit 16 also has a control unit 80 for controlling the vehicular remote control system 10 and a door lock unit 90 which coacts with the control unit 80. The control unit 80 and the door lock unit 90 may be of an integral structure.

To the control unit 80, there are connected the RF transceiver circuit 42, the RF receiver circuit 342, the LF transmitter circuits 54, 56, 58, 60, the door sensor 20, a buzzer 82, and a hazard light 84. When the doors are properly locked, the buzzer 82 produces a single beep to indicate that the doors are properly locked. The buzzer 82 also produces a succession of six beeps as a warning. When the doors are automatically locked, the buzzer 82 and the hazard light 84 are simultaneously turned on for answer back, i.e., the buzzer 82 produces a beeping sound and the light 84 flickers.

To the door lock unit 90, there are connected the door switches 28, the door lock switch 22, the door lock knob switches 26, and the door lock actuators 14.

The components of the vehicle-mounted unit 16 are supplied with electric energy from a battery 86 mounted on the vehicle 12.

Each of the control units 80, 100, 301 and the door lock unit 90 has a CPU (Central Processing Unit), a ROM (Read Only Memory), a RAM (Random Access Memory), a clock generator, a counter, and a timer. The CPU automatically carries out a series of calculations or a data processing operation according to a program and data stored in the ROM.

For an easier understanding of the present invention, the vehicle-mounted unit 16 is controlled by a CPU 30 of the control unit 80 including the door lock unit 90, and the portable unit 18 is controlled by a CPU 70 of the control unit 100. The transmitter 300 is controlled by a CPU 302 of the control unit 301.

The vehicular remote control system 10 which incorporates the vehicular door lock remote control apparatus according to the present embodiment is basically arranged and operates as described above. More detailed arrangement and operation of the vehicular remote control system 10 will be described below with reference to flowcharts.

Figure 6:
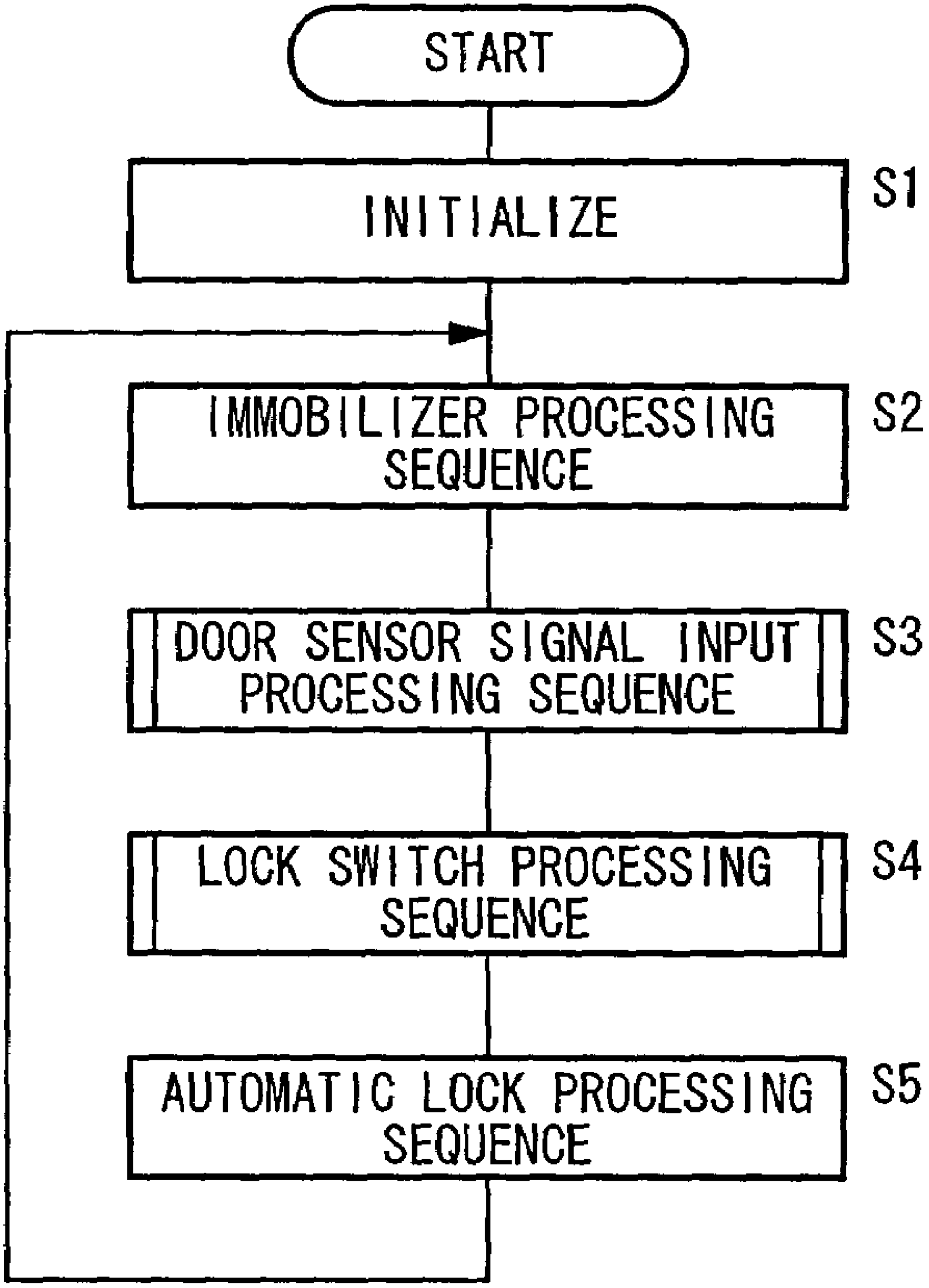
FIG. 6 is a flowchart of a general processing sequence.

FIG. 6 is a flowchart of a general processing sequence of a program which is mainly executed by the CPU 30 of the vehicle-mounted unit 16, and additionally executed by the CPU 70 of the portable unit 18. The general processing sequence will first be described below.

In step S1, when the battery 86 is connected to the accessories in the vehicle 12 including the vehicle-mounted unit 16 and supplies electric energy to activate the CPU 30, the CPU 30 carries out an initializing process. In the initializing process, the CPU 30 sets various variables, a timer, a counter, etc. to initial values.

When the replaceable cells 110, 310 such as a button cell are placed in the portable unit 18 and the transmitter 300, they are initialized. After the portable unit 18 and the transmitter 300 are initialized, the CPUs 70 and 302 enter a sleep mode, i.e., a mode to wait for activation.

When the portable unit 18 receives a request signal (LF signal) transmitted from the vehicle-mounted unit 16, it wakes up (activates) the CPU 70 from the sleep mode. When the lock switch 306 or the unlock switch 308 is operated, it wakes up the transmitter 300 to transmit an RF signal.

To avoid complexity in understanding the present embodiment, the CPUs 70, 302 and the CPU 30, which are the main units for executing the program, will basically not be referred to in the description of the processing sequence.

After the initializing process in step S1, steps S2 through S5, from an immobilizer process to an automatic locking process, are periodically repeated.

In an immobilizer processing sequence in step S2, a process for permitting a startup of the engine of the vehicle 12 is carried out.

In a door sensor signal input processing sequence in step S3, a process for unlocking the doors based on an operating of the door sensor 20 is carried out.

In a lock switch processing sequence in step S4, a process of locking the doors based on an operation of the door lock switch 22 is carried out.

In an automatic locking processing sequence in step S5, a process for automatically locking the doors is carried out. Basically, in the automatic locking processing sequence is carried out as follows. The user of the portable unit 18 gets off the vehicle 12 and closes all the doors. When the portable unit user walks out of the effective transmission ranges for request signals that are transmitted from the vehicle 12, i.e., the range ETO around the vehicle 12, all the doors of the vehicle 12 are automatically locked. Since the doors are automatically locked, an oversight on the part of the portable unit user to lock the doors is prevented.

In the present embodiment, because of their relative importance, the door sensor signal input processing sequence in step S3 and the lock switch processing sequence in step S4 will be described in detail below. Therefore, the immobilizer processing sequence in step S2 and the automatic locking processing sequence in step S5 will not be described in detail below.

Basic operation of the door sensor signal input processing sequence in step S3, the lock switch processing sequence in step S4, and a process of inhibiting operation of the door sensor in the door sensor signal input processing sequence in step S3 will be described below in the named order.

Figure 7:
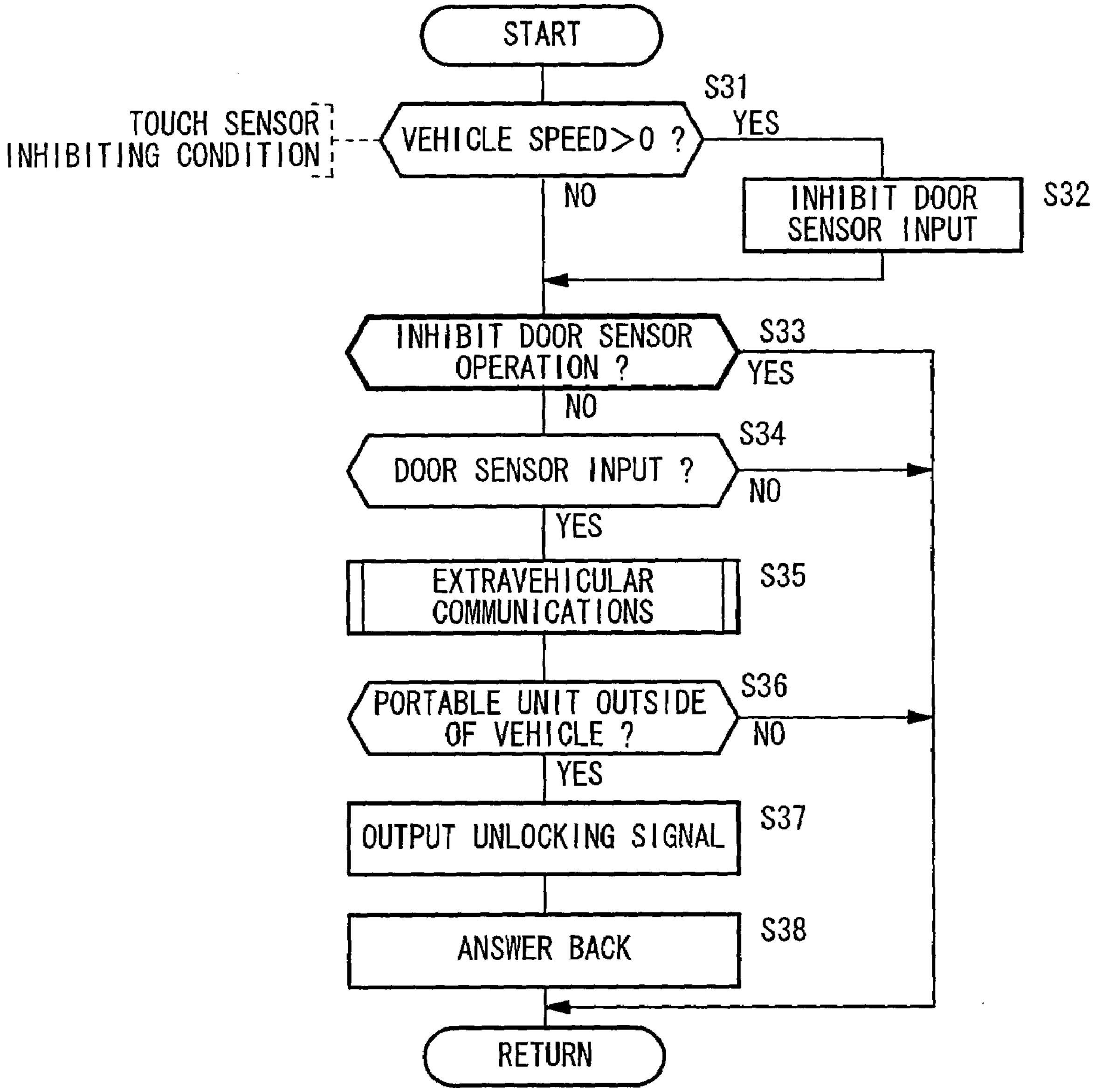
FIG. 7 is a detailed flowchart of a door sensor signal input processing sequence in the general processing sequence.

FIG. 7 shows in detail the basic operation of the door sensor signal input processing sequence in step S3.

When the door sensor signal input processing sequence in step S3 is started, it is determined whether the vehicle speed read from a speedometer (not shown) on the vehicle exceeds 0 [km/h] (vehicle speed >0) or not in step S31. If the vehicle 12 is in motion, then it is judged that no human input action has been made on the door sensor 20, and control goes to the lock switch processing sequence in step S4, skipping the processing in step S34 and the following steps. That is, while the vehicle 12 is running, any input action made on the door sensor 20 is invalid. Input action made on the door sensor 20 is valid only when the vehicle 12 is at rest or parked.

If it is judged that the vehicle 12 is at rest, then a door sensor operation inhibiting process while the vehicle 12 is at rest is effected in step S33. If operation of the door sensor is not inhibited, then control goes to step S34 to confirm whether there is an input action on the door sensor 20 or not. If there is no input action on the door sensor 20, then all the remaining steps are skipped.

If there is an input action on the door sensor 20, i.e., if the door sensor 20 is touched and its electrostatic capacitance is changed, an extravehicular communication processing sequence between the vehicle-mounted unit 16 and the portable unit 18 is carried out in step S35.

The door sensor 20 is touched, i.e., the outer door handle is gripped, by the user of the portable unit 18 usually for the purpose of opening the door when all the doors of the vehicle 12 have been locked.

Figure 8:
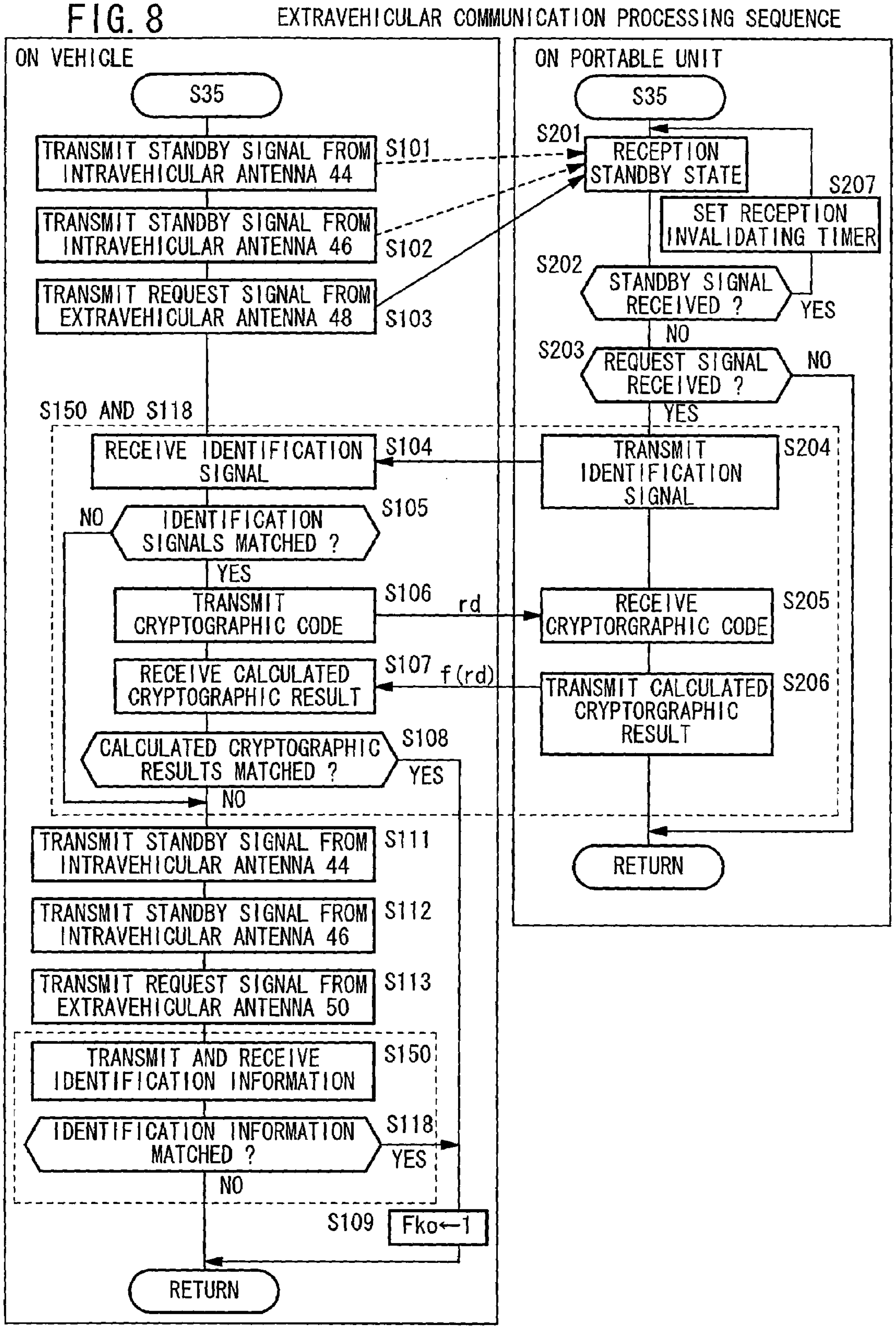
FIG. 8 is a detailed flowchart of an extravehicular communication processing sequence.

FIG. 8 shows in detail the extravehicular communication processing sequence in step S35. The extravehicular communication processing sequence is basically a mutual communication process that is carried out between the vehicle-mounted unit 16 and the portable unit 18 for authentication when request signals are transmitted from the LF antennas 48, 50 of the vehicle-mounted unit 16 to the LF antenna 108 of the portable unit 18, to activate the portable unit 18.

The extravehicular communication processing sequence serves as a process for detecting the legitimate portable unit 18, which has been authenticated, that is possibly positioned in the area ETO around the vehicle 12 and outside of the vehicle 12, or stated otherwise, that is possibly positioned in the area ETO around the vehicle 12 except the region that overlaps with the range ETI within the passenger's compartment.

In step S101, the intravehicular LF antenna 44 transmits a standby signal in the effective transmission range TA1. In step S102, the intravehicular LF antenna 46 transmits a standby signal in the effective transmission range TA2. In step S103, the extravehicular LF antenna 48 transmits a request signal for requesting the transmission of an identification signal in the range ETO around the vehicle 12. Thus, the standby signal from the intravehicular LF antenna 44, the standby signal from the intravehicular LF antenna 46, and the request signal from the extravehicular LF antenna 48 are successively transmitted in steps S101, S102, S103, respectively.

If it is judged that the portable unit 18 which is in a reception standby mode in step S201 receives the standby signal in step S202, a reception invalidating timer is set in step S207, bringing the LF receiver circuit 106 into a reception inhibiting mode and de-energizing the RF transceiver circuit 102 until the reception invalidating timer runs out of time upon reception of the standby signal. Therefore, if the portable unit 18 is positioned in the passenger's compartment, since it does not receive the request signal, it is inhibited from returning (transmitting) an RF signal. Consequently, if the portable unit 18 is positioned in the passenger's compartment, i.e., if the driver of the vehicle 12 is sitting on the driver's seat with the portable unit 18, the vehicle-mounted unit 16 and the portable unit 18 are prevented from communicating with each other even when a person who is not carrying the portable unit 18 (portable unit non-user) touches the door sensor 20 outside of the vehicle 12. Thus, the door is prevented from being unlocked by the portable unit non-user. At the same time, as the RF transceiver circuit 102 is de-energized, the consumption of electric energy by the portable unit 18 is reduced.

Figure 9:
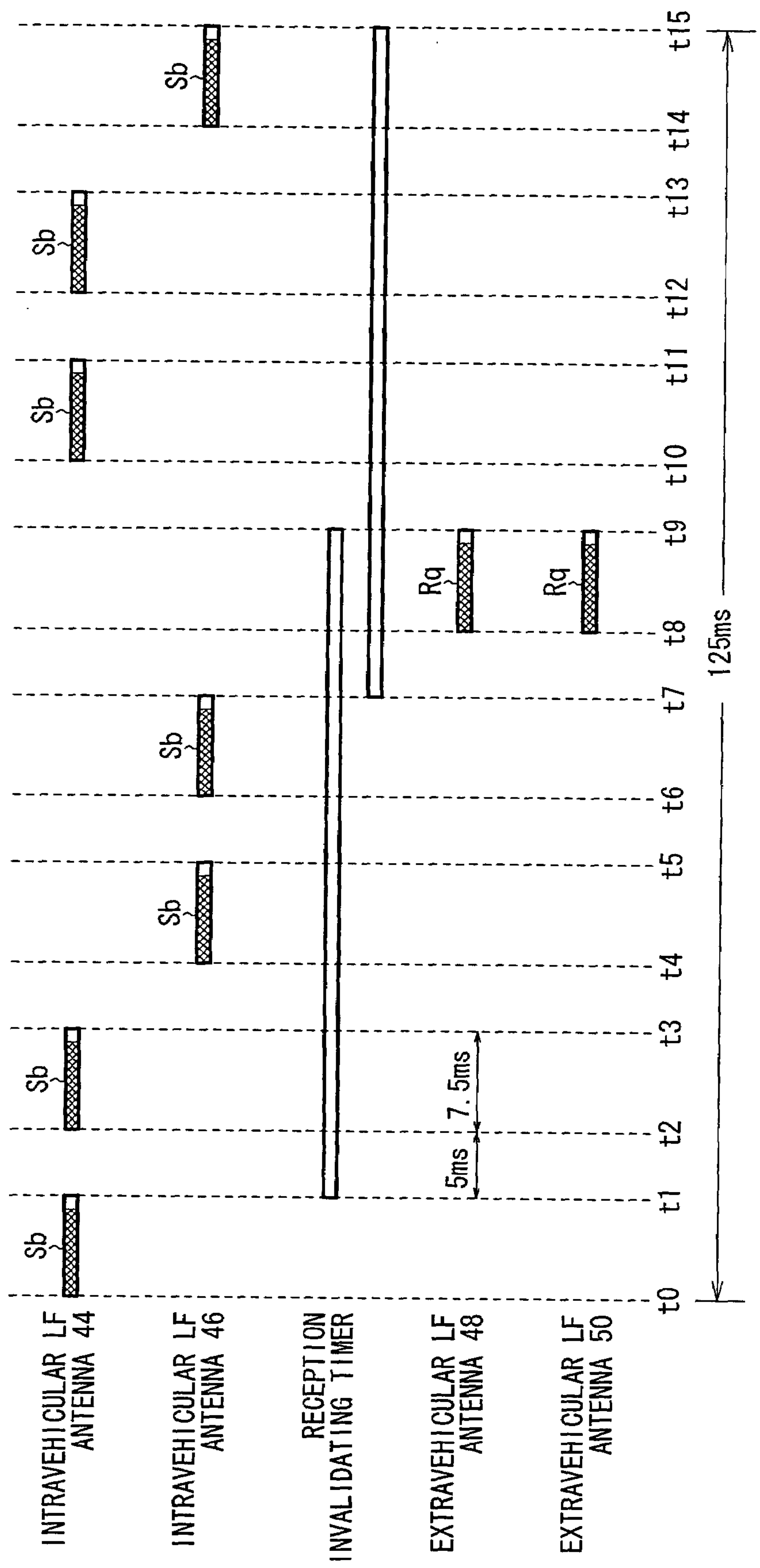
FIG. 9 is a timing chart illustrative of a standby signal processing sequence.

The above standby signal processing sequence will be described in detail below with reference to FIG. 9. A standby signal Sb having a duration of 7.5 [ms] is transmitted from the intravehicular LF antenna 44 twice at an interval of 5 [ms] between times t0 to t3. Thereafter, a standby signal Sb is transmitted from the intravehicular LF antenna 46 twice at an interval of 5 [ms] between times t4 to t7.

After the standby signals Sb are transmitted from the intravehicular LF antennas 44, 46, request signals Rq having a duration of 7.5 [ms] are transmitted from the extravehicular LF antennas 48, 50 at an interval of 5 [ms].

The CPU 70 determines whether the transmitted signal is a standby signal Sb or a request signal Rq based on a tail end 3-bit code (blank area) of the signal that is 7.5 [ms] long. The signal also includes a burst signal (hatched area) used for synchronization prior to the tail end 3-bit code.

When the portable unit 18 receives a standby signal Sb, it sets the reception invalidating timer to a time of 50 [ms]. As can be understood from FIG. 9, the portable unit 18, which has received the standby signal Sb, does not receive a request signal Rq. For example, when the portable unit 18 receives a standby signal Sb between times t0 to t1, it does not receive a request signal Rq up to time t9, and when the portable unit 18 receives a standby signal Sb between times t6 to t7, it does not receive a request signal Rq up to time t15. Since the portable unit 18 that is present in the passenger's compartment is controlled so as not to transmit and receive RF signals in coaction with a received standby signal Sb and the reception invalidating timer, the portable unit 18 is prevented from wasting electric energy.

The standby signal Sb is transmitted twice from each of the intravehicular LF antennas 44, 46 because it can be transmitted without being effected by noise.

If the portable unit 18 does not receive a standby signal Sb, then the answer to step S202 becomes negative. Control goes to step S203 to determine whether the portable unit 18 has received a request signal Rq or not. If the portable unit 18 has not received a request signal Rq, then control goes back to the reception standby mode in step S201.

In the extravehicular communication processing sequence shown in FIG. 8, if a request signal Rq destined for the portable unit 18 that is in the range ETO around the vehicle 12 where a standby signal Sb is not received, is transmitted from the extravehicular LF antenna 48 to the range ETO around the vehicle 12 in step S103. The CPU 70 judges that the transmitted request signal Rq is received by the portable unit 18 in step S203, then an identification signal inherent in the portable unit 18, which serves as a response signal for the request signal, is read from the ROM and transmitted as an RF signal through the RF transceiver circuit 102 from the RF antenna 104 to the vehicle-mounted unit 16 in step S204.

In step S104, the vehicle-mounted unit 16 receives the identification signal through the RF antenna 40. Then, in step S105, the vehicle-mounted unit 16 determines whether the received identification signal matches an identification signal stored in the ROM of the vehicle-mounted unit 16 or not. Usually, the ROM in the control unit 80 stores several identification signals. Only the legitimate portable unit 18 which stores in its ROM the identification signal that matches one of the identification signals stored in the control unit 80, is capable of mutual communications with the vehicle 12 by way of RF signals.

If it is judged that the received identification signal matches an identification signal stored in the ROM of the vehicle-mounted unit 16 in step S105, then the CPU 30 generates a cryptographic code rd (random number) and transmits the cryptographic code rd as an RF signal through the RF transceiver circuit 42 from the RF antenna 40 to the portable unit 18 in step S106. In step S205, the portable unit 18 receives the cryptographic code rd in the form of an RF signal through the RF antenna 104.

In step S206, the CPU 70 of the portable unit 18 substitutes the cryptographic code rd as a variable x in a function f(x) stored in its ROM, calculates a function value f(rd), and then transmits the calculated function value f(rd) as a calculated cryptographic result in the form of an RF signal from the RF antenna 104, thus completing the extravehicular communications in the portable unit 18.

Then, in step S107, the vehicle-mounted unit 16 receives the function value f(rd) through the RF antenna 40.

In step S108, the vehicle-mounted unit 16 determines whether the received function value f(rd), i.e., the received calculated cryptographic result, matches its own calculated function value or not. Specifically, the CPU 30 of the vehicle-mounted unit 16 also substitutes a cryptographic code rd self-generated in a function f(x) stored in its ROM, calculates a function value f(rd), and determines whether the calculated function value f(rd) matches the received calculated cryptographic result or not.

If it is judged that the calculated function value f(rd) matches the received calculated cryptographic result, then an outside-vehicle portable unit flag Fko is set (Fko←1) in step S109. Mutual authentication is normally carried out, putting an end to the extravehicular communication processing sequence in step S35 shown in FIG. 8.

In step S36 shown in FIG. 7, it is determined whether the portable unit 18 is positioned near the outside of the vehicle 12 or not based on whether the outside-vehicle portable unit flag Fko is set or not. If mutual authentication is successful and the outside-vehicle portable unit flag Fko is set in step S109, then since the answer to step S36 is affirmative, the CPU 30 of the control unit 80 outputs a door unlocking signal in step S37.

The door lock unit 90 rotates the lock motor 32 of the door actuator 14 in a door unlocking direction, angularly displacing the locking lever 36 off the door lock. The door can now be opened by pulling the outer door handle 21.

In step S38, the above answer back process is carried out to indicate that the doors are properly unlocked to the user of the portable unit 18. That is, the buzzer 82 and the light 84 are simultaneously turned on for answer back, i.e., the buzzer 82 produces a single beeping sound and the light 84 flickers.

The door sensor signal input processing sequence in step S3 shown in FIG. 7 is now put to an end.

If the received identification signal does not match the identification signal stored in the ROM of the vehicle-mounted unit 16 in step S105, or if the cryptographic result calculated by the CPU 30 does not match the received calculated cryptographic result in step S108, then a processing similar to the processing in steps S101 through S108 is carried out in steps S111, S112, S113, S150, S118 in order to determine whether the portable unit 18 is near a rear seat of the vehicle 12, rather than a door mirror of the vehicle. Specifically, it is confirmed in step S113 whether the legitimate portable unit 18 is in the range ETO around the vehicle 12 with respect to the effective transmission range TA4 of the LF antenna 50 that is mounted on the door lining of the door behind the driver-side door.

When the door sensor 20 is operated in the door sensor signal input processing sequence in step S3, if the user of the portable unit 18 is not near the outside of the door, or more accurately, if the user of the portable unit 18 is not in the range ETO around the vehicle 12 except the region that overlaps with the range ETI within the passenger's compartment, then since the answer to step S36 is negative, the doors are not unlocked. Therefore, the door is prevented from being unlocked even if a person without the portable unit 18 operates the door sensor 20.

The identification information referred to in claims corresponds to the identification signal or the calculated cryptographic result, and the flow from steps S104 to S108 is represented by steps S150, S118. Specifically, step S150 indicating a process of transmitting and receiving the identification information corresponds to steps S104, S106, S107, and step S118 for determining whether the received identification information matches calculated identification information or not corresponds to step S105, S108.

The lock switch processing sequence in step S4 will be described below.

Figure 10:
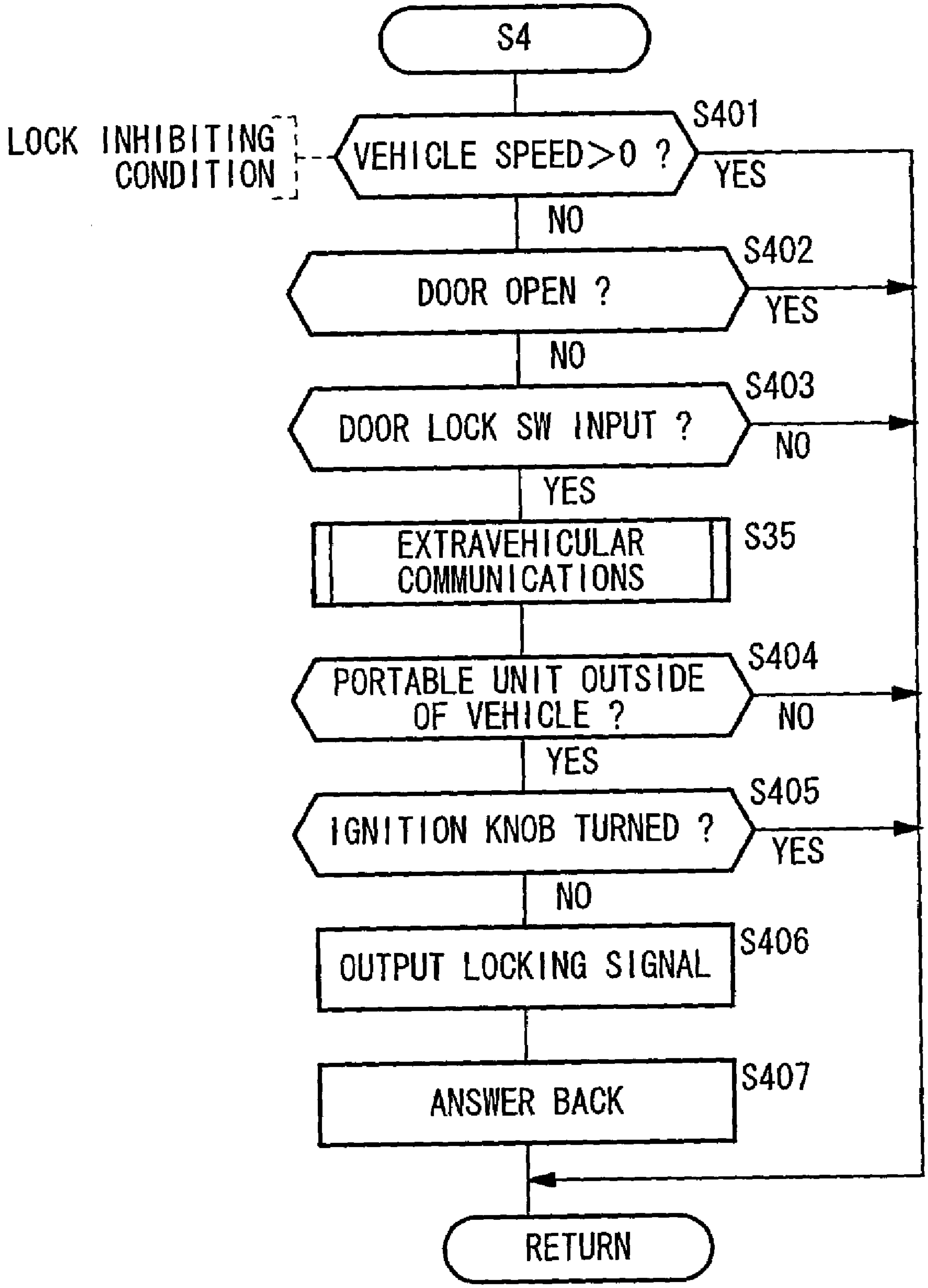
FIG. 10 is a detailed flowchart of a lock switch processing sequence.

FIG. 10 shows the lock switch processing sequence.

If the vehicle 12 is running in step S401, then the lock switch processing sequence is skipped. If the vehicle 12 is at rest, control goes to step S402. In the lock switch processing sequence, i.e., the process of manually locking the door by operating the door lock switch 22, the doors are locked on the assumption that all the doors of the vehicle 12 are closed. Therefore, it is determined in step S402 whether each of the doors is open or not.

Specifically, on or off states of the four front and rear door switches 28 of the vehicle 12 are read by the CPU 30 through the door lock unit 90 to detect the opening of a door. If all the door switches 28 are turned off, then control goes to step S403. If at least one of the door switches 28 is turned on, then the remaining process is skipped.

In step S403, it is determined whether the door lock switch 22 is operated or not, i.e., whether there is a signal inputted from the door lock switch 22 or not. If a signal inputted from the door lock switch 22 is detected, then control goes to step S35. If a signal inputted from the door lock switch 22 is not detected, then the remaining process is skipped.

If there is a signal inputted from the door lock switch 22, then the intravehicular/extravehicular communication processing sequence is carried out to determine the position of the portable unit 18 as described above with reference to FIG. 8 in step S35, in order to start mutual communications with the portable unit 18 for authentication.

If mutual authentication is successful as a result of the intravehicular/extravehicular communication processing sequence and the outside-vehicle portable unit flag Fko is set, then the answer to step S404 is affirmative, confirming that the portable unit 18 is in the range ETO around the vehicle 12. Control then goes to step S405.

If the answer to step S404 is negative, then the operation of the door lock switch 22 in step S404 is regarded as being done by a portable unit non-user, and the subsequent processing is skipped. When the answer to step S403 is affirmative and then the answer to step S404 is negative, the doors are prevented from being locked by a portable unit non-carrier.

In step S405, it is determined whether the ignition knob has been rotated or not based on a signal outputted from the knob turn detecting switch 64. If the ignition knob has been rotated, i.e., if the ignition knob is in a position other than the off position, namely, the ACC (accessory) position or the ignition on position, then it is judged that the user of the portable unit 18 is in the vehicle 12, and the locking of the doors is skipped.

If the ignition knob is in the off position, then the CPU 30 outputs a door locking signal in step S406. The door lock unit 90 energizes the lock motor 32 of the door lock actuator 14, rotating the locking lever 36 to lock the doors.

In step S407, the above answer back process is carried out to indicate that the doors are locked to the user of the portable unit 18. That is, the buzzer 82 and the light 84 are simultaneously turned on for answer back, i.e., the buzzer 82 produces a single beeping sound and the light 84 flickers. The lock switch processing sequence in step S4 as illustrated in FIG. 10 is now put to an end.

The door sensor operation inhibiting process in step S33 will be described below.

Figure 11:
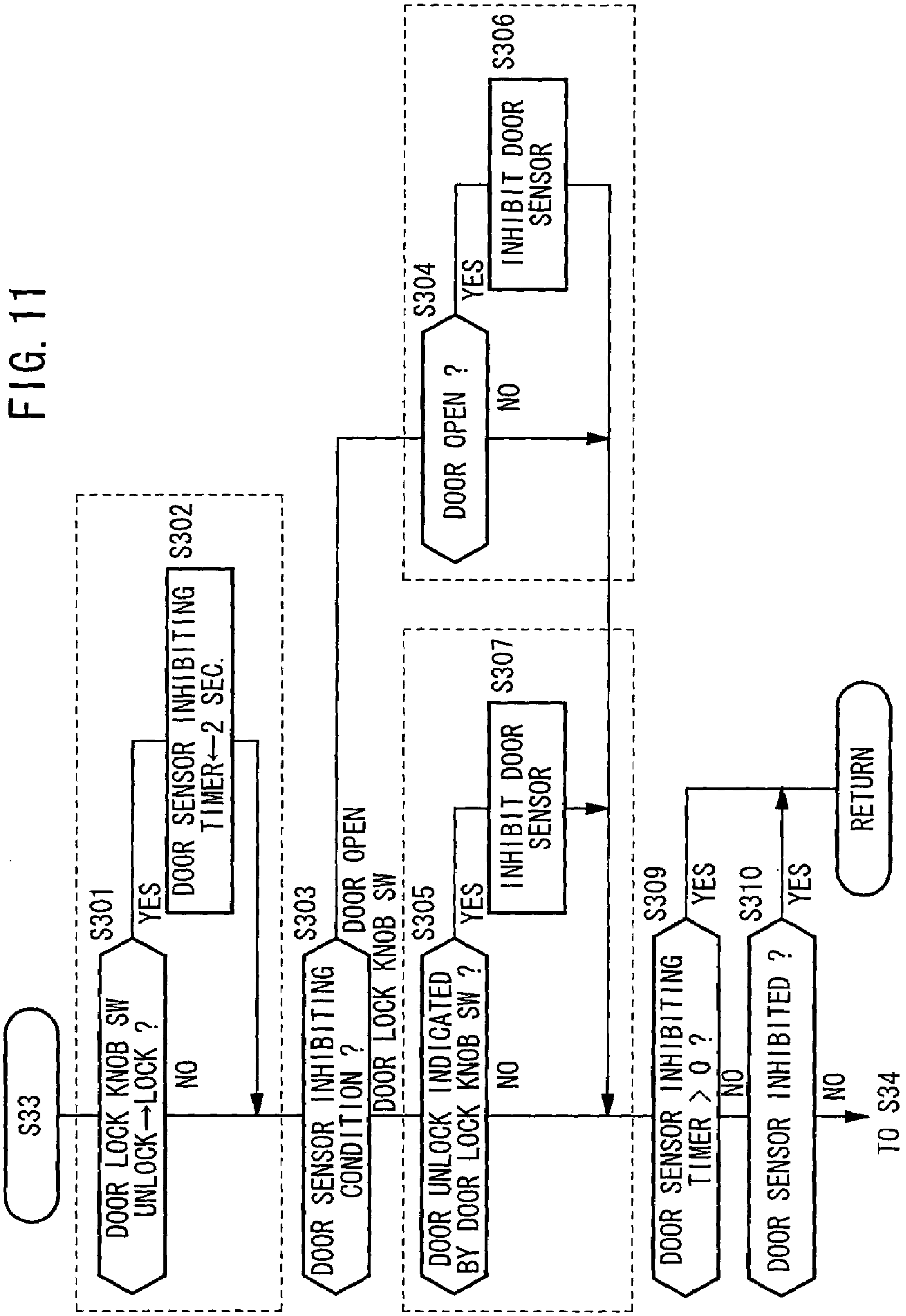
FIG. 11 is a detailed flowchart of a door sensor operation inhibiting process in the door sensor signal input processing sequence.

FIG. 11 shows in detail the door sensor operation inhibiting process. The door sensor operation inhibiting process is a process for inhibiting all communications between the portable unit 18 that is in the range ETO around the vehicle 12 and the vehicle-mounted unit 16 to prevent the electric energy stored in the batteries 86, 110 of the vehicle-mounted unit 16 and the portable unit 18 from being wasted, when the door sensor 20 may possibly be operated, but not for the purpose of unlocking the doors.

The door sensor 20 may possibly be operated not for the purpose of unlocking the doors in any of the cases described below. A person who may possibly operate the door sensor 20 is primarily supposed to be the user of the portable unit 18, but a person without the portable unit 18 may touch the door sensor 20 when the portable unit 18 (normally the user of the portable unit 18) is in the range ETO around the vehicle 12.

In a first case, after the doors are locked by the door lock switch 22 in the lock switch processing sequence in step S4, the door sensor 20 outputs a signal if a person touches the outer door handle 21 to pull the outer door handle 21 (or move the outer door handle 21 vertically, depending on the shape of the door handle 21) for confirming the locking of the doors.

In a second case, after the doors are locked remotely by the transmitter 300 of the keyless entry system, a person may touch the outer door handle 21 in order to confirm the locking of the doors.

In a third case, a person may touch the outer door handle 21 in order to close the door which has been open.

In a fourth case, a person may touch the outer door handle 21 to lock the door which has been open by pressing the door lock knob 24, thereafter gripping the outer door handle 21 and closing the door to lock the door. The door locking process in the fourth case is referred to as a keyless locking process.

In a fifth case, when the door is unlocked and closed, a person may touch the outer door handle 21 inadvertently or in order to open the door.

In step S301 of the door sensor operation inhibiting process in step S33, it is detected whether the signal outputted from the door lock knob switch 26 has changed from an ON state representing a door unlock to an OFF state representing a door lock. If the change from the ON state to the OFF state is not detected, then control goes to step S303. If the change is detected, then control goes to step S302.

In step S302, a door sensor inhibiting process which inhibits the door sensor 20 from operating is performed. Specifically, a request signal triggered by an operation of the door sensor 20 (activated by the user or non-user of the portable unit 18 who touches the outer door handle 21) is inhibited from being transmitted. For inhibiting the door sensor 20 from operating for a predetermined period of time, a door sensor inhibiting timer is set to count 2 seconds. The door sensor inhibiting timer starts counting down immediately after it is set. A request signal is inhibited from being transmitted by not supplying the request signal from the control unit 30 to the LF transmitter circuits 54, 56, 58, 60. Alternatively, a request signal is inhibited from being transmitted by turning off or stopping supplying electric energy to the transmitter circuits 54, 56, 58, 60 and the RF transceiver circuit 42.

The answer to step S301 becomes affirmative only the instant the signal outputted from the door lock knob switch 26 changes to the OFF state representing a door lock, i.e., the instant a door lock is detected in the present processing sequence cycle from a preceding processing sequence cycle in which a door unlock has been detected.

The answer to step S301 is affirmative in the first case described above (the doors are locked using the door lock switch 28 in the lock switch processing sequence in step S4), the second case described above (the doors are locked remotely by the transmitter 300 of the keyless entry system), and the fourth case described above (the keyless locking process).

In step S303, it is determined whether the inhibition of a request signal triggered by an operation of the door sensor 20 is based on step S304 determining whether the door is open or not, or based on step S305 determining whether the signal outputted from the door lock knob switch 26 represents a door unlock or not.

In step S304, it is determined whether the door on the driver's side, which has the door sensor 20, is open or not based on the signal outputted from the door switch 28. If it is judged that the door is closed, then control goes to step S309. If it is judged that the door is open, then since the doors do not need to be unlocked, the door sensor inhibiting process for inhibiting a request signal from being transmitted as described above, is performed in step S306. The answer to step S304 becomes affirmative in the third case (when the door that is open is closed) and the fourth case (when the door lock knob 24 is pressed and then the door handle 21 is gripped in order to lock the door which has been open).

In step S305, it is determined whether the signal outputted from the door lock knob switch 26 represents a door unlock or not. If it is judged that the signal outputted from the door lock knob switch 26 does not represent a door unlock, then control goes to step S309. If it is judged that the signal outputted from the door lock knob switch 26 represents a door unlock (the door lock knob switch 26 is turned on), then the door sensor inhibiting process for inhibiting a request signal from being transmitted is performed in step S307. The answer to step S305 becomes affirmative in the fifth case (when the door is unlocked and closed, an attempt is made to open the door).

In step S309, the door sensor inhibiting timer that has been set in step S302 is still measuring the set time. If the door sensor inhibiting timer is still measuring time, then the door sensor inhibiting process is continued, and control goes back to step S3, starting a next cycle of operation. If the door sensor inhibiting timer has ended measuring the predetermined time or is not measuring time, and is cleared, then control goes to step S310. The door sensor inhibiting timer is set to 2 seconds in view of about 1 second that is required to pull the door handle 21 in order to confirm whether the door is locked or not after it has been locked.

In step S310, it is determined whether the door sensor inhibiting process started in step S306 or S307 is still in progress or not. If the door sensor inhibiting process is still in progress, then the door sensor inhibiting process is continued, and control goes back to step S3, starting a next cycle of operation. If the door sensor operation inhibiting process is not in progress, then control goes back to step S34 of determining whether there is an input action on the door sensor 20 or not (see FIG. 7).

As described above, when the door sensor 20 may possibly be operated not for the purpose of unlocking the doors, e.g., when the CPU 30 detects the doors as being already unlocked from the signal outputted from the door lock knob switch 26, a request signal is inhibited from being transmitted from the vehicle-mounted unit 16 to the portable unit 18. Consequently, only when the doors really need to be unlocked, the vehicle-mounted unit 16 and the portable unit 18 perform mutual communications for authentication to unlock the doors at the time the door sensor 20 is touched. When there is no need for unlocking the doors, the vehicular remote control system 10 avoids consumption of electric energy, which would otherwise result from mutual communications for authentication triggered by a request signal when the door sensor 20 is touched.

Specifically, when there is no need for unlocking the doors, a request signal is inhibited from being transmitted to prevent the electric energy stored in the battery 86 on the vehicle 12 from being unduly consumed, and the locking of the doors can be confirmed by operating the outer door handle 21 after the doors are locked by the keyless entry system which employs the portable unit 18, the keyless locking system which employs the transmitter 300, or the key locking system which employs the immobilizer key 200.

It is possible to perform keyless locking on the doors with the transmitter 300 while the outer door handle 21 is being gripped. Since no unlocking signal is outputted even when the outer door handle 21 is touched while the door is open as it is unlocked during the keyless locking process, the door lock actuator 14 is prevented from chattering.

Furthermore, even when the outer door handle 21 is touched while the door is open as it is unlocked during the keyless locking process using the transmitter 300, a request signal is inhibited from being transmitted and no unlocking signal is outputted even if the portable unit 18 is carried.

Therefore, it is possible to perform keyless locking on the doors while the outer door handle 21 is being gripped. If there is no need to unlock the doors, then since no request signal is transmitted, the electric energy stored in the batteries 86, 110 on the vehicle 12 and the portable unit 18 is prevented from being unduly consumed. As no unlocking signal is outputted during the keyless locking process, the door lock actuator 14 is prevented from chattering.

The door lock switch 28 is disposed on the outer door handle 21 or in the vicinity thereof, so that it can easily be operated while the outer door handle 21 is being gripped.

According to the present invention, as described above, an unnecessary request signal is prevented from being transmitted, so that the electric energy stored in the batteries of the vehicle and/or the portable unit is prevented from being unduly consumed, and the doors are prevented from being unnecessarily unlocked.

Although a certain preferred embodiment of the present invention has been shown and described in detail, it should be understood that various changes and modifications may be made therein without departing from the scope of the appended claims.

What is claimed is:

1. A vehicular door lock remote control apparatus comprising:
- a door sensor for detecting when a door handle on an outer side of a vehicle is touched and outputting a signal representing the detected touch;
- vehicle-side transmitting means for transmitting a transmission request signal in response to the signal outputted from said door sensor;
- a portable unit for transmitting identification information in response to the transmission request signal from said vehicle-side transmitting means;
- vehicle-side receiving means for receiving the identification information transmitted from said portable unit;
- control means for determining whether the identification information received by said vehicle-side receiving means matches identification information stored on the vehicle, and unlocking a door of the vehicle based on the determined result;
- locked/unlocked state detecting means for detecting a locked/unlocked state of said door;
- a timer for starting to measure a predetermined time when said locked/unlocked state detecting means detects when said door has changed from said unlocked state to said locked state; and
- inhibiting means for inhibiting the transmission request signal from being transmitted from said vehicle-side transmitting means while said timer is measuring the predetermined time.

2. A vehicular door lock remote control apparatus according to claim 1, wherein said inhibiting means comprises means for inhibiting the transmission request signal from being transmitted from said vehicle-side transmitting means when said locked/unlocked state detecting means detects the unlocked state of said door.

3. A vehicular door lock remote control apparatus according to claim 1, further comprising:
- open/closed state detecting means for detecting an open/closed state of said door;
- said inhibiting means comprising means for inhibiting the transmission request signal from being transmitted from said vehicle-side transmitting means when said open/closed state detecting means detects the open state of said door.

4. A vehicular door lock remote control apparatus according to claim 1, further comprising:
- a switch disposed on or near said door handle for outputting an operation signal when operated;
- said vehicle-side transmitting means comprising means for transmitting said transmission request signal in response to the operation signal outputted from said switch;
- said control means comprising means for locking said door if the identification information received by said vehicle-side receiving means matches the identification information stored on the vehicle when the operation signal is inputted from said switch.

5. A vehicular door lock remote control apparatus according to claim 1, wherein said locked/unlocked state detecting means comprises a door lock knob switch.

6. A vehicular door lock remote control apparatus comprising:
- a door sensor for detecting when a door handle on an outer side of a vehicle is touched and outputting a signal representing the detected touch;
- vehicle-side transmitting means for transmitting a transmission request signal in response to the signal outputted from said door sensor;
- a portable unit for transmitting identification information in response to the transmission request signal from said vehicle-side transmitting means;
- vehicle-side receiving means for receiving the identification information transmitted from said portable unit;
- control means for determining whether the identification information received by said vehicle-side receiving means matches identification information stored on the vehicle, and unlocking a door of the vehicle based on the determined result;
- locked/unlocked state detecting means for detecting a locked/unlocked state of said door; and
- inhibiting means for inhibiting the transmission request signal from being transmitted from said vehicle-side transmitting means when said locked/unlocked state detecting means detects the unlocked state of said door.

7. A vehicular door lock remote control apparatus according to claim 6, further comprising:
- a switch disposed on or near said door handle for outputting an operation signal when operated;
- said vehicle-side transmitting means comprising means for transmitting said transmission request signal in response to the operation signal outputted from said switch;
- said control means comprising means for locking said door if the identification information received by said vehicle-side receiving means matches the identification information stored on the vehicle when the operation signal is inputted from said switch.

8. A vehicular door lock remote control apparatus according to claim 6, wherein said locked/unlocked state detecting means comprises a door lock knob switch.

9. A vehicular door lock remote control apparatus comprising:
- a door sensor for detecting when a door handle on an outer side of a vehicle is touched and outputting a signal representing the detected touch;
- vehicle-side transmitting means for transmitting a transmission request signal in response to the signal outputted from said door sensor;

a portable unit for transmitting identification information in response to the transmission request signal from said vehicle-side transmitting means;

vehicle-side receiving means for receiving the identification information transmitted from said portable unit;

control means for determining whether the identification information received by said vehicle-side receiving means matches identification information stored on the vehicle, and unlocking a door of the vehicle based on the determined result;

open/closed state detecting means for detecting an open/closed state of said door; and inhibiting means for inhibiting the transmission request signal from being transmitted from said vehicle-side transmitting means when said open/closed state detecting means detects the open state of said door.

10. A vehicular door lock remote control apparatus according to claim 9, further comprising:

a switch disposed on or near said door handle for outputting an operation signal when operated;

said vehicle-side transmitting means comprising means for transmitting said transmission request signal in response to the operation signal outputted from said switch;

said control means comprising means for locking said door if the identification information received by said vehicle-side receiving means matches the identification information stored on the vehicle when the operation signal is inputted from said switch.

* * * * *